W. L. MOONEY.
TILE MOLDING APPARATUS.
APPLICATION FILED JUNE 12, 1909.
972,704.
Patented Oct. 11, 1910.
2 SHEETS—SHEET 2.
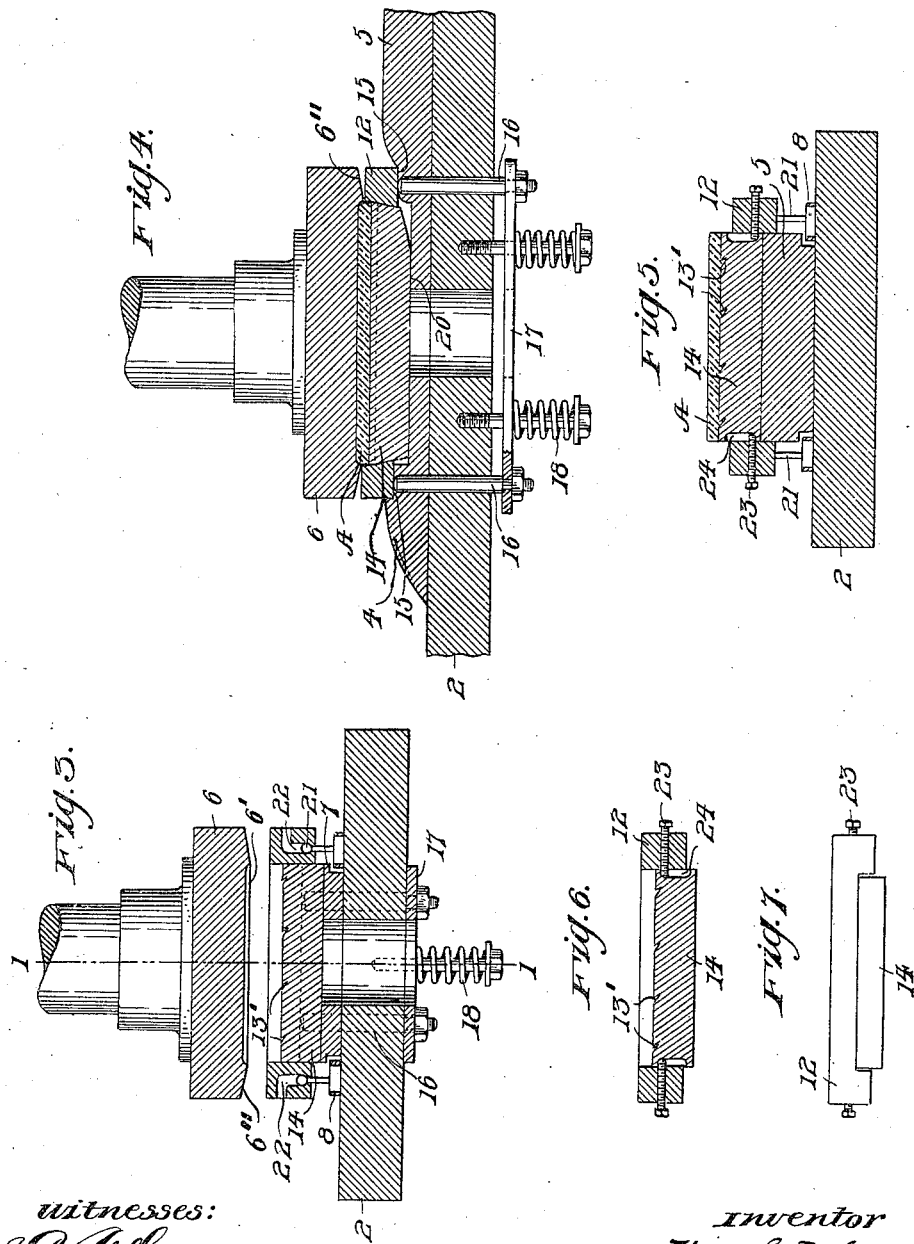

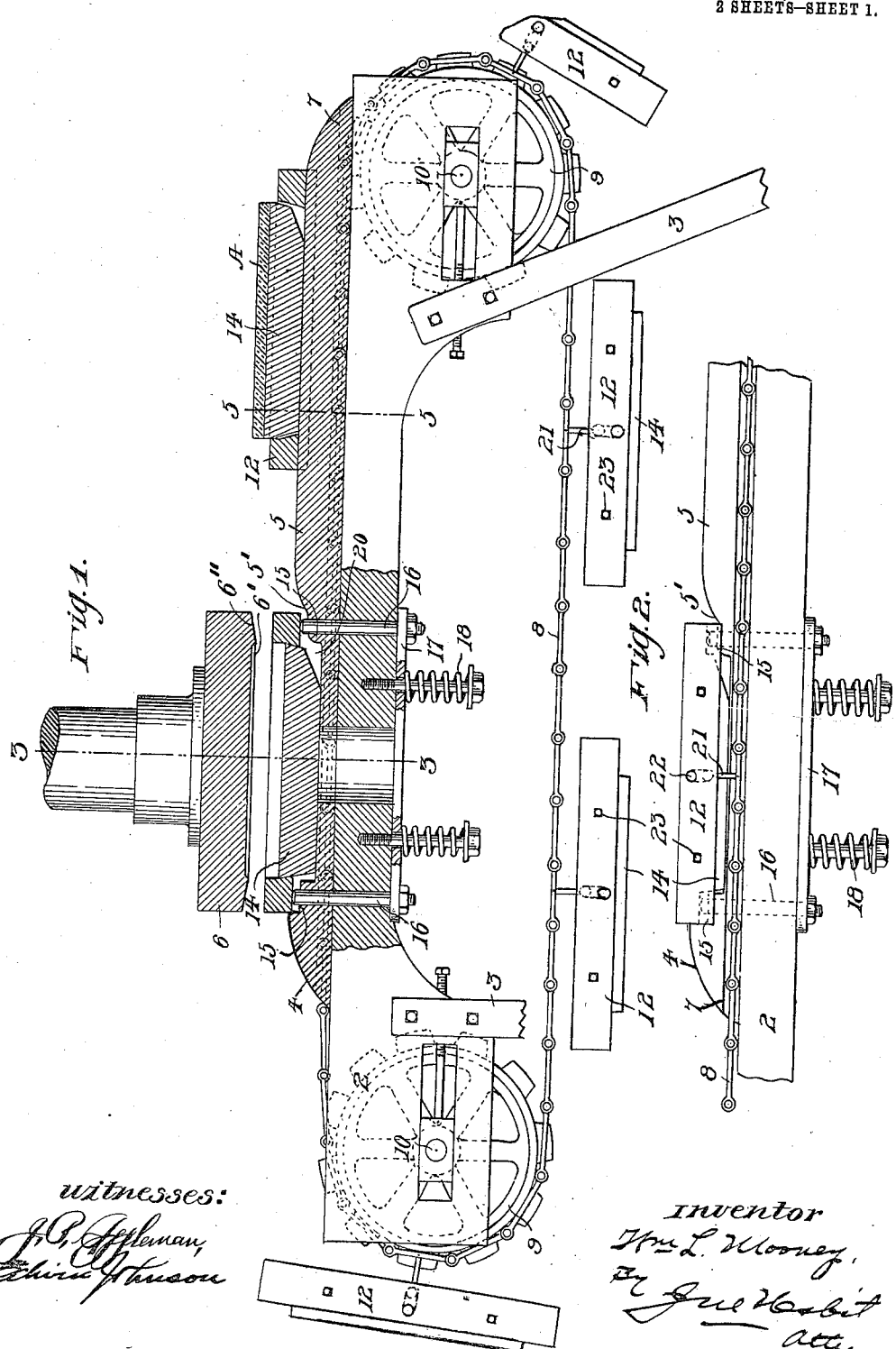

UNITED STATES PATENT OFFICE.

WILLIAM L. MOONEY, OF WESTON, WEST VIRGINIA.

TILE-MOLDING APPARATUS.

972,704.     Specification of Letters Patent.     Patented Oct. 11, 1910.

Application filed June 12, 1909. Serial No. 501,739.

*To all whom it may concern:*

Be it known that I, WILLIAM L. MOONEY, a resident of Weston, in the county of Lewis and State of West Virginia, have invented certain new and useful Improvements in Tile-Molding Apparatus, of which the following is a specification.

This invention relates to the general type of glass molding apparatus shown in Letters Patent No. 916,574 granted to me March 30th, 1909, and has particular reference to pressing glass tiles. In the machine of said patent the yielding or compensating elements active in the pressing operation move with the plunger. It has been found advantageous to arrange said parts on the mold support and free of the plunger, and one object of the present invention is to provide mechanism of this character.

A further purpose is to provide a mold with a movable bottom to raise the pressed article so that it may be readily removed.

Still a further object is to embody these desirable structural features in an endless carrier machine, *i. e.*, a machine in which a series of molds are moved successively to and from pressing position by mechanical means.

With these objects in view, the invention consists in the novel structural features, and combination and arrangement of parts, hereinafter fully described and claimed and illustrated by the accompanying drawings, wherein—

Figure 1 is a longitudinal section of the upper portion of the machine on line 1—1 of Fig. 3, the lower portion being in side elevation. Fig. 2 is an elevation of the mold and pressing mechanism in the position shown in Fig. 1. Fig. 3 is a cross-section on line 3—3 of Fig. 1. Fig. 4 is a longitudinal section like Fig. 1 but with the parts in pressing position. Fig. 5 is a cross-section on line 5—5 of Fig. 1. Fig. 6 is a cross-section of one of the molds detached, and Fig. 7 is an end view of the same.

Referring to the drawings, 2 designates a table which may be supported in any suitable manner, legs 3 being here shown. Secured to the top surface of this table is a longitudinal guiding member consisting of the front portion 4 and the rear portion 5, the guide intermediate said portions being recessed downwardly at 20 to define the pressing position in which the molds are lodged during the pressing operation.

6 designates the pressing plunger, slightly recessed on its under face at 6'.

The opposite longitudinal edges of the guide are shouldered longitudinally as indicated at 7, and movable over the table and extending partially beneath these shoulders are endless conveyer chains 8 which pass around sprocket wheels 9 mounted in the ends of the table on adjustable shafts 10, one of said shafts carrying a hand operated wheel or crank, not shown.

The mold seating depression 20 is formed at opposite sides with shoulders 15, and movable vertically through these shoulders are rods 16 carried by plate 17 beneath table 2, and with springs 18 holding the plate and rods normally raised. The mold-positioning depression 20 is slightly deeper than shoulders 15, so that when the full pressure is applied in the pressing operation, as in Fig. 4, the mold bottom may depend somewhat beneath the mold sides 12, the body of the tile A being formed partially within the mold sides and partially within plunger depression 6', and with the ribs on the bottom of the tile formed in grooves 13' in the top face of mold-bottom 14. The molds are somewhat wider than the mold guides 4 and 5, so that the mold sides overhang the latter above chains 8, to which the rim-like member is loosely secured by the headed pins 21 working in cavities 22, thus affording the mold rim vertical movement with relation to the chains.

In operation, the molds move successively to pressing position, being directed thereto by the approach end 4 of the mold guide, and when in position the mold rim 12 is supported by rods 16 above shoulders 15, and with the mold bottom 13 depressed, as in Figs. 1 and 3. In this position a cavity is provided for receiving the molten glass and affords opportunity for the same to float or spread out over the mold bottom. When the pressure is applied by the lowering of plunger 6, rim part 12 of the mold is depressed onto shoulders 15 and mold bottom 13 is forced down onto the bottom of cavity 20, as in Fig. 4. When the pressure is removed by raising the pressing head, the mold rim is thereupon lifted by rods 16 and the mold is in position to be advanced over rounded end 5' of part 5 of the mold guide, or into the position indicated at the right hand of Fig. 1. When thus moved, part 5 of the guide operates to raise the mold bottom and project the pressed tile and its ribs or undercuts above the plane of rim 12, as in Fig. 5, so that the tile may be readily slipped off. Screw pins 23 in the mold rim and grooves 24 in the edges of the mold bottom limit such movement and hold the parts together, particularly when the molds are inverted on the chains. The under face 6″ of the pressing head, surrounding depression 6′, is preferably beveled, as shown, so that any excess glass may crowd out over the top edge of rim 12.

While the improved mold mechanism is shown in connection with an endless carrier for moving the molds successively to and from pressing position, the invention is not limited thereto and the same may be modified in other particulars without departing from the spirit and scope of the appended claims.

I claim:—

1. In tile pressing apparatus, a mold consisting of a rim-like member and a bottom member movable vertically therein, a vertically movable rim-depressing plunger, depressible supporting means for the rim holding the latter normally raised beneath the plunger, and means backing up the mold bottom during the pressing operation.

2. In glass pressing apparatus, an open top mold consisting of a rim-like side member and a bottom member carried by and movable vertically therein, press mechanism, a depressible spring-raised support for the side member coincident with the press mechanism for holding said member raised with relation to the bottom member, and means for raising the mold bottom within the side member when the mold is out of pressing position.

3. In glass pressing apparatus, an open top mold consisting of a rim-like side member and a vertically movable bottom member, a mold support on which the mold is movable, press mechanism, the support having a depression coincident with the press mechanism to permit the mold bottom to lower, and means on the support beyond the pressing position for raising the mold bottom.

4. In glass pressing apparatus, a mold consisting of a rim-like side member and a vertically movable bottom member, a support on which the mold is movable, press mechanism, normally raised depressible devices in the support and coincident with the press mechanism for sustaining the side member of the mold in elevated position with relation to the bottom member, and means on the support at one side of the press mechanism for raising the mold bottom.

5. In glass pressing apparatus, a horizontal table, a mold guide and support on the top of the table and formed with longitudinal shoulders at opposite sides thereof, said guide and support downwardly recessed to form a pressing position, a mold consisting of a rim-like side member and a vertically movable bottom member with means limiting such vertical movement, the mold side member being wider than said guide and support, carrier chains movable over the table and extending beneath said shoulders, means securing the mold side members to the carrier chains, the mold guide and support at each side of the pressing position depression operating to raise the mold bottom within the side member.

6. Glass pressing apparatus comprising a table, a mold guide on the top surface thereof, said guide having longitudinal shoulders at opposite sides thereof, press mechanism, the guide having a depression coincident with the press mechanism, molds movable over the guide and having vertically movable bottoms, each mold adapted to fit within the guide depression with its bottom lowered, downwardly yielding means at the depression for holding the mold sides normally raised, the mold guide at one side of the pressing position operating to raise the mold bottom when the mold is moved thereover, conveyer chains movable beneath the guide shoulders, and vertically movable connections between the mold sides and the chains.

In testimony whereof I affix my signature in presence of two witnesses.

WILLIAM L. MOONEY.

Witnesses:
J. B. BENNETT,
W. T. WHEELER.